Patented May 13, 1941

2,241,795

UNITED STATES PATENT OFFICE 2,241,795

ACID AZO DYESTUFFS

Carl Taube, Leverkusen-I. G.-Werk, and Heinrich Rinke, Leverkusen-Schlebusch, Germany, assignors to General Aniline & Film Corporation, a corporation of Delaware No Drawing. Application May 24, 1939, Serial No. 275,398. In Germany May 30, 1938

4 Claims. (Cl. 260—161)

The present invention relates to acid yellow azodyestuffs and to a method of preparing the same; more particularly it relates to azodyestuffs of the general formula

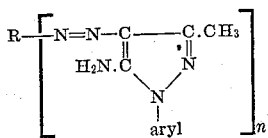

In this formula R—[—N=N—]$_n$ stands for the radical of a tetrazo component, $n$ stands for 2 and the dyestuffs contain at least one acid group in the molecule.

The new dyestuffs are obtainable by coupling diazo compounds of aromatic amines with 1-aryl-3-methyl-5-amino-pyrazoles whereby the components are selected in such a manner that the dyestuffs formed contain at least one acid group.

As diazotizable aromatic amines may be mentioned the amines of the benzene series and their alkyl-, halogen, sulfo and sulfamino derivatives, the meta-sulfonic acids of 4.4'-diaminodiphenyl and the derivatives thereof, the 4.4'-diaminodiphenyl-1.1'-cyclohexane and its derivatives, and the 4.4'-diaminodiphenyldimethylmethane and the derivatives thereof. As aryl radical of the 1-aryl-3-methyl-5-aminopyrazoles may be mentioned the phenyl and naphthyl radicals and their alkyl, halogen, sulfo, sulfamino and alkoxy derivatives.

The new dyestuffs are especially suited for dyeing wool and silk and yield on these fibers dyeings of good fastness properties.

The following examples illustrate our invention without, however, restricting it thereto, the parts being by weight.

Example 1

34.4 parts of 4.4'diaminodiphenyl-2.2'-disulfonic acid are tetrazotized in the usual way with 6.9 parts of sodium nitrite and coupled with 17.3 parts of 1-phenyl-3-methyl-5-aminopyrazole in bicarbonate alkaline solution. The dyestuff which corresponds in its free state to the following formula

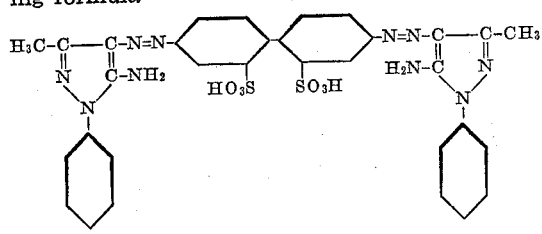

is isolated and dried. It dyes wool from an acid bath yellow shades fast to light, washing and milling.

Example 2

9.2 parts of 4.4'-diaminodiphenyl-2.2'-disulfonic acid are tetrazotized in the usual way, neutralized with sodium bicarbonate and mixed with an alcoholic solution of 7.2 parts of 1-(2'.4'-dichlorphenyl)-3-methyl-5-aminopyrazole. After several hours' stirring the dyestuff formation is completed; the dyestuff is salted out, filtered with suction and dried. It corresponds in its free state to the following formula

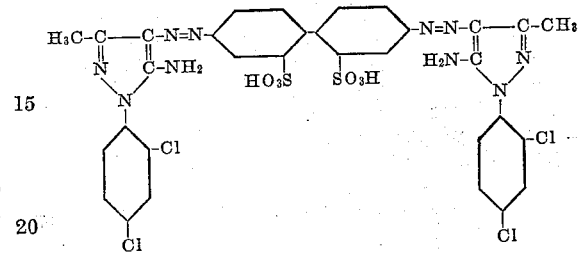

and dyes wool from an acid bath clear yellow shades of good fastness to milling and light.

Similar dyestuffs are obtained if the 1-(2'.4'-dichlorphenyl)-3-methyl-5-aminopyrazole is replaced by 1-(4'-methoxyphenyl)-, 1-(2'-methoxyphenyl)-, 1-(2'-chlorphenyl)- or 1-(2'.4'.5'-trichlorphenyl)-3-methyl-5-aminopyrazole.

Example 3

The tetrazo solution prepared in the usual way from 2.4 parts of 4.4'-diaminodiphenyl-1.1'-cyclohexane is added to a bicarbonate alkaline solution of 4.4 parts of 1-(2'-chloro-5'-sulfophenyl)-3-methyl-5-aminopyrazole. After several hours the formed dyestuff is salted out at water bath temperature and filtered off. It corresponds in its free state to the following formula

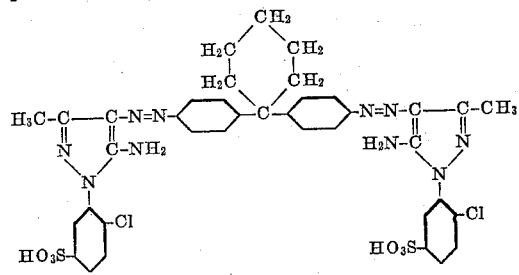

and dyes wool from an acid bath greenish-yellow shades of good fastness to milling.

Similar dyestuffs are obtained if the 4.4'-diamino-diphenyl-1.1'-cyclohexane is replaced by the 3.3'-dimethyl-4.4'-diaminodiphenyl-1.1'-cyclohexane.

Example 4

A tetrazo solution prepared in the usual way from 1.7 parts of 4.4'-diaminodiphenyl-dimethylmethane is added to a bicarbonate alkaline solution of 4.5 parts of 1-(2'-chloro-5'-sulfophenyl)-3-methyl-5-aminopyrazole and after several hours the formed dyestuff is precipitated by adding dilute hydrochloric acid. The dyestuff corresponds in its free state to the following formula

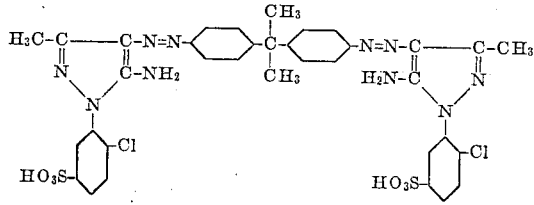

and dyes wool from an acid bath yellow shades.

We claim:

1. As new products acid yellow azodyestuffs of the general formula

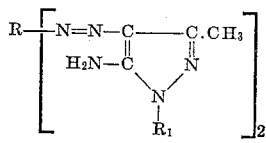

wherein R—[—N=N—]$_2$ stands for the radical of an aromatic tetrazo compound, and R$_1$ stands for a radical selected from the group consisting of the benzene and naphthalene series which dyestuffs contain at least one sulfonic acid group in the molecule and dye animal fibers yellow shades of good fastness properties.

2. As new products acid yellow azodyestuffs of the general formula

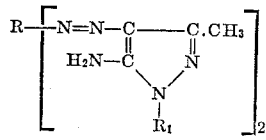

wherein R—[—N=N—]$_2$ stands for the radical of a tetrazo diphenyl compound, and R$_1$ stands for a radical selected from the group consisting of the benzene and naphthalene series which dyestuffs contain at least one sulfonic acid group in the molecule and dye animal fibers yellow shades of good fastness properties.

3. As new products acid yellow azodyestuffs of the general formula

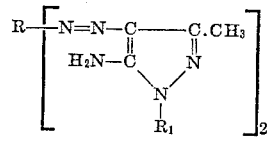

wherein R—[—N=N—]$_2$ stands for the radical of tetrazotized 4.4'-diaminodiphenyl-2.2'-disulfonic acid, and R$_1$ stands for a radical selected from the group consisting of the benzene and naphthalene series dyeing animal fibers yellow shades of good fastness properties.

4. As a new product the azodyestuff corresponding in its free state to the following formula

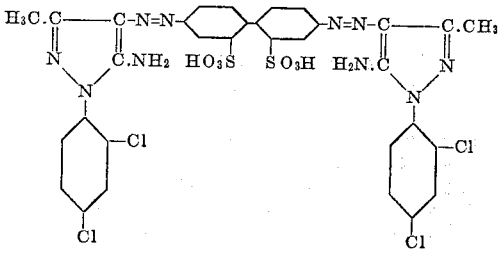

and dyeing wool clear yellow shades of good fastness to milling and light.

CARL TAUBE.
HEINRICH RINKE.